United States Patent [19]

Herzog

[11] Patent Number: 4,834,294
[45] Date of Patent: May 30, 1989

[54] INJECTION NOZZLE CONSTRUCTION

[76] Inventor: Kurt Herzog, Sennrütistrasse 7, CH 9113 Degersheim, Switzerland

[21] Appl. No.: 174,125

[22] Filed: Mar. 28, 1988

[30] Foreign Application Priority Data

Apr. 2, 1987 [CH] Switzerland .......... 1268/87

[51] Int. Cl.$^4$ .............................. B05B 1/32
[52] U.S. Cl. .................. 239/584; 239/533.1; 239/570; 239/579; 251/231; 425/564; 425/568
[58] Field of Search ........... 239/569, 570, 579, 533.1, 239/584, 525; 251/231, 282, 90; 425/563, 564, 568, 146; 74/527

[56] References Cited

U.S. PATENT DOCUMENTS

| | | | |
|---|---|---|---|
| 3,912,133 | 10/1975 | Hehl | 425/563 |
| 3,954,209 | 5/1976 | Ramond | 425/146 |
| 4,069,092 | 1/1978 | Zink et al. | 156/500 |
| 4,076,485 | 2/1978 | Sokolow | 425/563 |
| 4,272,236 | 6/1981 | Rees et al. | 425/564 |
| 4,333,608 | 6/1982 | Hendry | 239/118 |
| 4,427,361 | 1/1984 | Saito | 425/563 |

FOREIGN PATENT DOCUMENTS 1439001 9/1966 France.
587718 5/1977 Switzerland.

Primary Examiner—Andres Kashnikow
Assistant Examiner—Christopher G. Trainor
Attorney, Agent, or Firm—McGlew & Tuttle

[57] ABSTRACT

A nozzle head of thermoplastic material injection nozzle is closed in the customary manner with a closure head which has a jet orifice. A jet needle closes the jet orifice in a closed position. The needle is held axially displaceable in a needle bearing. An actuation lever is set into a slit-like recess in the needle bearing and it is supported with a bearing ball carried at the rear wall of the needle bearing. A stroke transmission bolt set inbetween jet needle and actuation lever in overhung position serves for transmitting the closing force from the actuation lever to the jet needle. Upon opening, the injection pressure pushes the jet needle rearward if the actuation lever is rotated into the open position. In this arrangement a locking spring becomes superfluous and, consequently, no force counter to the spring force must be effected by the injection force.

10 Claims, 1 Drawing Sheet

INJECTION NOZZLE CONSTRUCTION

FIELD AND BACKGROUND OF THE INVENTION

This invention relates in general to the construction of nozzles and in particular to a new and useful injection nozzle for a thermoplastic synthetic processing injection molding machine.

Swiss Pat. No. CH-A-587 718 indicates an injection nozzle with spring-loaded jet needle, which opens automatically when subjected to the melt under injection pressure. It is proven to be disadvantageous that the injection pressure must be utilized in order to move the jet needle against the force of a locking spring, since this can lead to a pressure loss. Furthermore, such nozzle has a laid length, increased by the length of the spring, which through the adapter required for a static mixer or a filter element is extended additionally increasing the disadvantage.

SUMMARY OF THE INVENTION

The invention provides an injection nozzle, in which the jet needle can be moved back in the injection material without pressure loss and in which the laid length is significantly shortened.

Accordingly, it is an object of the invention to provide an improved injection nozzle for thermoplastic injection molding machines and which includes a jet needle which is cooperative with a closure head having a jet discharge and which includes a shaft portion which is journalled in a needle bearing which is actuated by engagement of a stroke transmitting bolt into a substantially spherical recess in the shaft portion of the jet needle and which at its other end engages in a recess of a pivotal tongue which is pivoted in the needle bearing on a ball bearing which is journalled in a recess of the needle bearing.

A further object of the invention is to provide an injection nozzle which is simple in design, rugged in construction and economical to manufacture.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which a preferred embodiment of the invention is illustrated.

DESCRIPTION OF THE PREFERRED EMBODIMENTS

Figure 1:
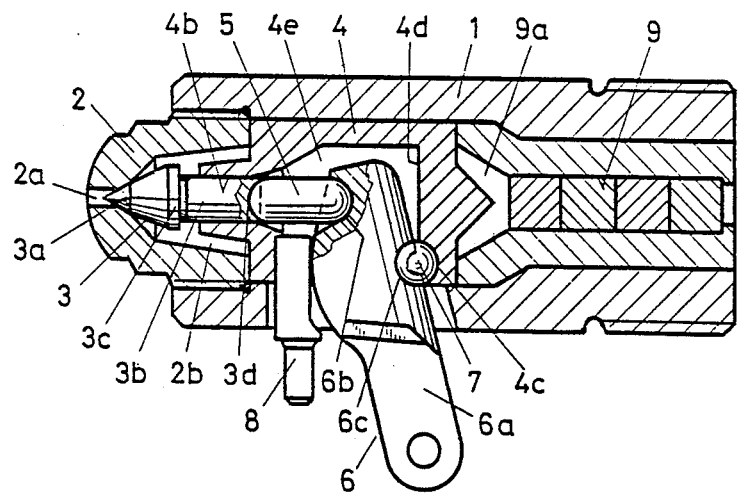
FIG. 1 is a longitudinal sectional view of a nozzle constructed according to the invention with the jet needle in the closed position.

Referring to the drawings in particular, the invention embodied therein comprises an injection nozzle for thermoplastic synthesis processing injection molding machines which comprises a tubular nozzle head 1 which has a discharge end and an opposite material feed end which is closed at the discharge end by a closure head 2 which has a jet orifice 2A.

A nozzle head 1 of identical external shape as the nozzle head known for CH-A-587 718 is closed by a likewise known closure head 2 with a jet orifice 2a. The closure head 2 in this arrangement is screwed into the hollow space of the nozzle head 1.

A jet needle 3 with a jet tip 3a, a needle shoulder 3c, a guide shaft 3b, and a spherical or calotte-shaped depression 3d are provided at the rear part of guide shaft 3b.

Figure 3:
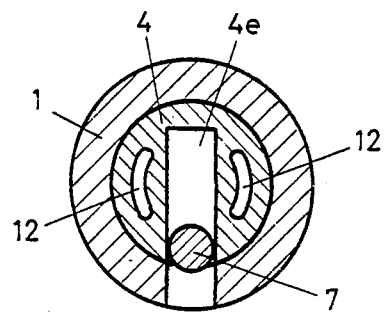
FIG. 3 is a sectional view transversely through the nozzle taken along the line III—III in FIG. 2.

The needle shaft 3b is held axially displaceable in a bore 4b of a needle bearing 4. According to FIG. 3 the needle bearing is a cylindrical body with a slit-like recess 4e, which is closed by a rear wall 4d against the feed duct 9a for the melt and two banana-shaped slits 12 for passing the melt through into the pressure chamber 2b located in the closure head.

An actuation lever 6 is located in the slit-like recess 4e and it has an actuation tongue 6a projecting outward of the nozzle head 1. The actuation lever 6 has on a front side or side of the jet needle a first spherical calotte-shaped depression 6b and on its rear side a second spherical calotte-shaped depression 6c which is aligned with a further such depression 4c in a rear wall 4d of the needle bearing and serves to hold a bearing ball 7.

As FIG. 1 shows the first spherical calotte-shaped depression 6b with the spherical calotte-shaped depression 3d at the guide shaft 3b is aligned in the closed position with the axis of the jet needle 3. Into these two recesses 3d, 6b a stroke transmitter bolt 5 is set in an overhung position forming a toggle link.

Fixing the actuation lever 6 in slit 4e of the needle bearing 4 takes place with a positioning pin 8, which crops out on the outside at the strip heater. After taking out this positioning pin 8 and after removing the closure head 2 and the jet needle 3 as well as the stroke transmitter bolt 5 the actuation lever 6 can be pulled out.

Figure 2:
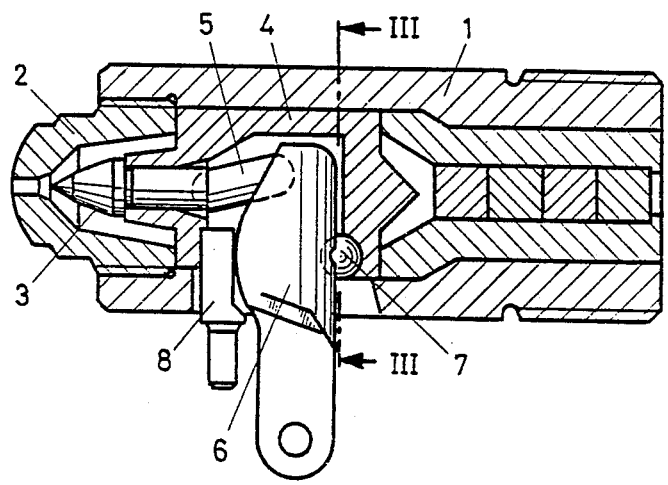
FIG. 2 is the same sectional view as FIG. 1, but with the jet needle in the open position.

To open the jet orifice 2a the actuation lever 6 is slid forward into the position according to FIG. 2. With the injection pressure, which acts upon the conical part of the jet needle 3, the jet needle 3 and the stroke transmitter bolt 5 are simultaneously moved out of the closed position. Of the injection pressure, therefore, only a very small portion is required for opening the nozzle.

For closure the actuation lever 6 is moved into the position according to FIG. 1, whereby the stroke transmitter bolt 5 moves the jet needle 3 into the closed position.

Through the omission of a locking spring, free space 9 results behind the needle bearing 4 in the nozzle head 1. Into this space easily a static mixer, a filter element or both can be set in combination, which makes an additional adapter superfluous and, shortens the laid length.

While a specific embodiment of the invention has been shown and described in detail to illustrate the application of the principals of the invention, it will be understood that the invention may be embodied otherwise without departing from such principals.

What is claimed is:

1. An injection nozzle for thermoplastic synthesis processing injection molding machines, comprising a tubular nozzle head having a discharge end and an opposite infeed end, a closure head closing the discharge end having a jet discharge orifice and having a hollow interior, a needle bearing having an interior cavity with a bearing opening extending toward said nozzle head and having a lever opening extending in a lateral direction, a jet needle having a conical tip facing into the orifice and a shaft portion journalled in the bearing opening of said needle bearing and having an end facing into the cavity with a shaft end which has a substantially spherical recess, an actuation lever pivotally mounted in said needle bearing and having a face directed toward said shaft portion with a substantially spherical recess and having a tongue projecting through the lever opening, and a stroke transmission member disposed between said actuation lever and said jet needle having substantially spherical ends engaged in respective recesses in the needle shaft and said lever.

2. An injection nozzle according to claim 1, wherein said jet needle has a needle shoulder which tapers inwardly in a direction toward said shaft portion, said shaft portion being of a smaller diameter in the area of said needle shoulder.

3. An injection nozzle according to claim 1, wherein said substantially spherical recesses are calotte-shaped depressions, said stroke transmission member being substantially aligned with said shaft portion of said needle when said needle is in a position closing said jet orifice.

4. An injection nozzle according to claim 1, wherein said lever includes a base opposite to said needle with a spherical recess, said needle bearing having an interior wall of the cavity with a spherical recess aligned with the spherical recess of said lever and including a roller bearing in said recess supporting said lever for pivotal movement in said needle bearing.

5. An injection nozzle according to claim 4, wherein said nozzle head and said needle bearing both have a lateral opening, said lever having a tongue portion extending out of said nozzle head through said lateral openings.

6. An injection nozzle according to claim 5, wherein said needle bearing has through flow openings for the passage of a melt material.

7. An injection nozzle for thermoplastic synthesis processing injection molding machines, comprising a tubular nozzle head having a discharge end and an opposite infeed end, a closure head closing the discharge end having a jet discharge orifice and having a hollow interior, a needle bearing having an interior cavity with front and rear wall portions, a bearing opening extending through the front wall portion toward said nozzle head and having a lever opening extending in a lateral direction between the front and the rear wall portions, a jet needle having a conical tip facing into the orifice, a shoulder extending radially inwardly facing in an opposite direction to the conical tip towards the bearing opening, a shaft portion extending from said shoulder and journaled in the bearing opening with an end of the shaft portion facing into the cavity, an actuation lever having opposite ends and pivotally mounted between its ends in said needle bearing and having one end adjacent said shaft portion and the other end projecting through the lever opening, and a stroke transmission member disposed between, and having opposite ends pivotally mounted on, said one end of the actuation lever and said end of the shaft portion thereby forming a toggle linkage so that the stroke transmission member is movable between a first position substantially aligned with the shaft portion and a second position inclined to the shaft portion corresponding to movement of the needle between positions closing and opening the jet discharge orifice, respectively.

8. An injection nozzle according to claim 7 wherein the opposite ends of the stroke transmission member are substantially spherical and wherein said one end of the actuation lever and said end of the shaft portion are formed with spherical recesses engaging said opposite ends of the stroke transmission member to effect their pivotal mounting, the pivotal mounting of the actuation lever comprising spherical depressions formed in opposed relation in a wall of the interior cavity adjacent the lever opening and in a side of the actuation lever, respectively, and a rolling bearing confined between the opposed depressions.

9. An injection nozzle according to claim 8 wherein said pivotal mounting of the actuation lever is at the rear wall portion of the needle bearing cavity, the front side of the actuation lever having a convex surface portion and a positioning pin inserted through the lever opening between the convex surface portion of the actuation lever and the front wall portion of the needle bearing cavity fixing the lever and thereby the transmission member in the cavity.

10. An injection nozzle according to the claim 7 wherein the needle bearing has flow openings extending axially of the nozzle outside the interior cavity for conveying melt to the discharge opening outside the interior cavity.

* * * * *